United States Patent [19]

Nishida et al.

[11] Patent Number: 5,189,119
[45] Date of Patent: Feb. 23, 1993

[54] ARTICLE COATED WITH CATIONIC AND HYDROXYL GROUP-CONTAINING RESIN AND EPOXY RESIN

[75] Inventors: Reiziro Nishida; Akira Tominaga, both of Hiratsuka, Japan

[73] Assignee: Kansai Paint Co., Ltd., Hyogo, Japan

[21] Appl. No.: 780,835

[22] Filed: Oct. 21, 1991

Related U.S. Application Data

[62] Division of Ser. No. 481,567, Feb. 20, 1990, Pat. No. 5,096,984.

[30] Foreign Application Priority Data

Feb. 21, 1989 [JP] Japan .................................. 1-39423
Feb. 21, 1989 [JP] Japan ................................. 1-322643

[51] Int. Cl.$^5$ ...................... C08L 33/08; C08L 63/02; C08L 75/04; B32B 15/08
[52] U.S. Cl. .................................... 525/526; 523/402; 523/404; 523/409; 525/118; 525/423; 525/454; 428/418
[58] Field of Search .................. 523/402, 404, 409; 525/118, 423, 454, 526; 428/418

[56] References Cited

U.S. PATENT DOCUMENTS

| | | | |
|---|---|---|---|
| 3,454,482 | 7/1969 | Spoor et al. | 526/261 |
| 4,443,569 | 4/1984 | Schröder et al. | 523/404 |
| 4,542,173 | 9/1985 | Schupp et al. | 525/533 |
| 4,576,979 | 3/1986 | Schupp et al. | 523/414 |
| 4,788,234 | 11/1988 | Schipfer et al. | 525/533 |

FOREIGN PATENT DOCUMENTS 388740B 8/1989 Austria .
0121837A1 10/1984 European Pat. Off. .

OTHER PUBLICATIONS

Database WPI, No. 73-70435 Derwent Publications (Furukawa Electric Co. Ltd.).
Database WPI, No. 87-132580 Derwent Publications (Hitachi Cable KK).

*Primary Examiner*—Robert E. Sellers
*Attorney, Agent, or Firm*—Wenderoth, Lind & Ponack

[57] ABSTRACT

An article coated with a cationically electrodepositable paint composition comprises (A) a resin having hydroxyl and cationic groups, (B) an epoxy resin having at least 2 epoxy groups, each directly bound to an alicyclic ring, and (C) lead hydroxide and/or lead maleate as curing catalyst(s).

10 Claims, No Drawings

ARTICLE COATED WITH CATIONIC AND HYDROXYL GROUP-CONTAINING RESIN AND EPOXY RESIN

This application is a division of Ser. No. 07/481,567 filed Feb. 20, 1990, now U.S. Pat. No. 5,096,984.

This invention relates to a cationically electrodepositable paint composition, more detailedly to such a cationically electrodepositable paint composition that crosslinking and curing of its paint film can be carried out promptly and easily.

There have hitherto been known as main curing reaction types of paint films of cationically electrodepositable paints, for example, an urethane curing reaction by isocyanate group by baking which dissociates and active hydrogen group, self-crosslinking-curing by terminally active double bond, etc. Further, it has also widely been recognized that lead compounds are effective as catalysts to accelerate these curing reactions.

There can be mentioned as specific examples of lead compounds compounded in cationically electrodepositable paints and processes of their compounding, the following lead compounds and processes, namely ① a water insoluble compound of an inorganic acid and lead such as basic lead silicate, basic lead sulfate, lead phosphate or lead chromate is previously dispersed in a resin wherein a pigment is dispersed, and the dispersion is compounded into an electrodepositable paint;

② a water soluble lead such as lead acetate is dissolved in water and the solution is then added to an electrodepositable paint;

③ an oil soluble lead salt of a long chained fatty acid such as lead oleate, lead, lead octanoate or lead naphthenate is dispersed together with a dispersing resin in water, and the resulting dispersion is used as an electrodepositable paint; etc.

However, these processes have various disadvantages and their solution has strongly been desired. Namely, in the process ① it is compelled to decrease use amount of the lead compound, for example because the lead compound is hard to disperse into a fine particle state, is liable to sediment in the electrodepositable paint because of its large specific gravity, and becomes a cause of generation of lumps due to splash onto the horizontal surface of the matter to be painted. Moreover, the lead compounds have a small contact frequency (surface area) at the time of baking with the resin in the electrodepositable paint due to the compounds being granular solids, and many of the lead compounds have a poor catalytic action. In the above process ②, water soluble leads take a form of salt with an ac and thus, as is the case with many low molecular electrolytes, accelerate electrolysis of water at the time of formation of electrodeposition film to lower paint film-destroying voltage, and simultaneously are liable to leave many gas pin holes in the wet film. This gives serious disadvantages such as poor smoothness and generation of gas pin holes both after baking, and therefore use amount of the lead compounds are limited. In the above process 3, the lead compounds have a high long-chain fatty acid content, and thus, when used in a great amount, have a bad effect on corrosion resistance, etc. and at the same time strikingly lower water dispersibility. Therefore their use amount is also limited.

Besides the above processes ① to ③, a process ④ has recently disclosed wherein a chelated reaction product of a compound having β-hydroxyamino structure and lead oxide (II) is used (Japanese Laid-Open Patent Publication No. 152,676/1958, U.S. Pat. No. 4,788,234). Also in this process, it is necessary to make high concentration of an alkanolamine to react with lead oxide in order to make the lead content high, and thus it is complelled to use a low molecular weight compound of β-hydroxyamino structure. As results, there occur lowering of point film-destroying voltage due to the low molecular weight electrolytes which is substantially the same drawback as in the case of use of the water soluble leads in the above process ②, lowering of corrosion resistance as is the case with the oil soluble leads in the above ③ process, and the like.

The present inventors have made researches for development of a cationically electrodepositable paint capable of obviating all the drawbacks in the above usual processes ① to ④ and promptly and easily carrying out crosslinking and curing of the paint film. As a result, they have now found that the above objects can be attained by use of lead hydroxide or lead maleate as a lead compound, and have completed the present invention.

Thus, there is provided according to the present invention a cationically electrodepositable paint composition comprising as main component(s) resin vehicle(s) having crosslinking and curing properties, characterized in that the composition contains lead hydroxide and/or lead maleate as curing catalyst(s).

According to the cationically electrodepositable paint composition of the present invention which uses lead hydroxide or lead maleate as a curing catalyst, it is possible to promptly crosslink and cure the cationically electrodeposited paint film due to an excellent catalytic action by lead hydroxide or lead maleate, and moreover lead hydroxide and lead maleate can stably and easily disperse in a fine particle state in the electrodepositable paint and do not sediment during storage. Further, by making lead maleate and/or lead hydroxide contain, it is possible to attain various advantages, for example, advantages not to lower paint film-destroying voltage at the time of electrodeposition painting, not to spoil smoothness of the paint film and not to deteriorate storage stability.

Although lead hydroxide and lead maleate usable in the composition of the invention can take several forms in accordance with valency of lead and the like, preferred lead hydroxide is one represented by $Pb_2O(OH)_2$ or $Pb(OH)_2$ and preferred lead maleate is one represented by the following formula:

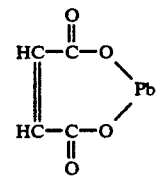

There can be used as such lead hydroxide and lead maleate those commercially available as reagents or industrial chemicals. These can be used as granular or powdery solid at room temperature.

Any cationically electrodepositable paint composition which can contain lead hydroxide or lead maleate can be used in the invention without particular limitation so long as it contains as main component(s) resin vehicle(s) having crosslinking and curing properties, and the composition can be selected from wide ranges. Specific examples thereof include, for example, in accordance with form of crosslinking and curing reactions, (a) a cationically electrodepositable paint obtained by utilizing an urethane exchange reaction of substrate resin having amino groups or hydroxyl groups and block polyisocyanate compound (curing agent), (b) a cationically electrodepositable paint obtained by utilizing a self-crosslinking reaction through polymerizable double bonds made to be contained in the ends or side chains of substrate resin, etc. Further, the present invention can also be applied to (c) an ethylene carbonate curing type cationically electrodepositable paint and (d) an ester-amide exchange type cationically electrodepositable paint.

The following are some examples of compositions for cationically electrodepositable paint which display the aforesaid effect when lead hydroxide and/or lead maleate are(is) compounded therein in accordance with the invention.

① a cationically electrodepositable paint which contains as a main component a resin containing amino, hydroxyl and block isocyanate groups in one molecule which resin is obtained by reacting epoxy compound, primary and/or secondary amine with partial block polyisocyanate (U.S. Pat. No. 3,922,253, U.S. Pat. No. 4,017,438). It is also possible to use a cationically electrodepositable paint containing complete block polyisocyanate in place of this partial block polyisocyanate.

② a cationically electrodepositable paint which crosslinks and cures by ester interchange reaction of resin having amino and hydroxyl groups (preferred starting material thereof is epoxy resin) with malonic ester derivatives (U.S. Pat. No. 4,458,054).

③ a cationically electrodepositable paint which contains as a main component a resin having terminal double bond, hydroxyl group and amino group (preferred starting material thereof is epoxy resin)- (EP 245786)

④ a cationically electrodepositable paint which contains an active polycarbamic acid ester type curing agent (U.S. Pat. No. 4720569).

The present inventors have further detailedly studied a catalytically curing effect of lead hydroxide and lead maleate in crosslinking and curing reaction of the electrodeposited paint film of cationically electrodepositable paints. As a result it has first been revealed that the above-mentioned various drawbacks can be obviated by compounding lead hydroxide and/or lead maleate in such cationically electrodepositable paint compositions as above-exemplified. Further, it has also been revealed that a still further excellent technical effect can be obtained by applying lead hydroxide and/or lead maleate to a cationically electrodepositable paint composition comprising (A) a resin having hydroxyl groups and cationic groups; and (B) an epoxy-containing curing resin having at least 2 epoxy functional groups each of which comprises an epoxy group directly bound to an alicyclic ring and/or bridged alicyclic ring on average per molecule as principal components (hereinafter, said composition is sometimes referred to as "epoxy curing CED paint"—see U.S. patent application Ser. No. 07/401,138 filed on Aug. 30, 1989 and European Patent Application No. 89115864.4 filed on Aug. 29, 1989).

This suitable epoxy curing CED paint is further detailedly described below.

The resin (A) having hydroxyl groups and cationic groups used in the epoxy curing CED paint which may be hereinafter referred to as "the base resin (A)") is optionally resin containing primary hydroxyl groups reactive with the epoxy group of the component (B) and a sufficient number of cationic groups for forming a stable aqueous dispersion. As said base resin (A), for example, what follows may be cited.

(i) A reaction product obtained by reacting a polyepoxy resin with a cationizing agent;

(ii) A polycondensation product of a polycarboxylic acid and polyamine (see U.S. Pat. No. 2,450,940) protonated with an acid;

(iii) A polyaddition product of polyisocyanate and polyol and mono- or poly-amine protonated with an acid;

(iv) A copolymer of an acryl or vinyl monomer containing a hydroxyl group and one containing amino group protonated with an acid (see Japanese Patent Publications Nos. 12395/1970 and 12396/1970);

(v) An adduct of a polycarboxylic acid resin and an alkylene imine protonated with an acid (see U.S. Pat. No. 3,403,088); etc.

Since the specific examples of these cationic resins and the processes for their production are described in, for example, Japanese Patent Publications Nos. 12395/1970 and 12396/1970, and GB 1327071 as well as U.S. Pat. Nos. 2,450,940, 3,403,088, 3,891,529 and 3,963,663, detailed description of the specific examples of these cationic resins and the processes for their production is replaced by quotation of these references in this specification.

What is especially desirable as the base resin (A) is a reaction product obtained by reacting a polyepoxide compound obtained from a polyphenol compound and epichlorohydrin with a cationizing agent included in (i), above.

Said polyepoxide compound is a compound having at least 2 epoxy groups

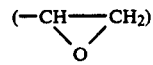

in one molecule, and having a number average molecular weight within the range of generally at least 200, preferably 400 to 4,000, more preferably 800 to 2,000 is suitable. As such polyepoxide compound, what is known per se may be used, for example, polyglycidyl ether of a polyphenol compound which may be produced by reacting a polyphenol compound with epichlorohydrin in the presence of an alkali, is included.

As the polyphenol compound which may be used in the above reaction, there may be cited, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylether, 4,4'-dihydroxydiphenylsulfone, phenol novolak and cresol novolak.

Of the aforesaid polyepoxide compounds, what is especially preferable for the production of the base resin (A), is polyglycidylether of a polyphenol compound having a number average molecular weight of at least about 380, more preferably about 800 to about 2,000 and an epoxy equivalent of 190 to 2,000, preferably 400 to 1,000, especially bisphenol A type epoxy resin represented by the following formula:

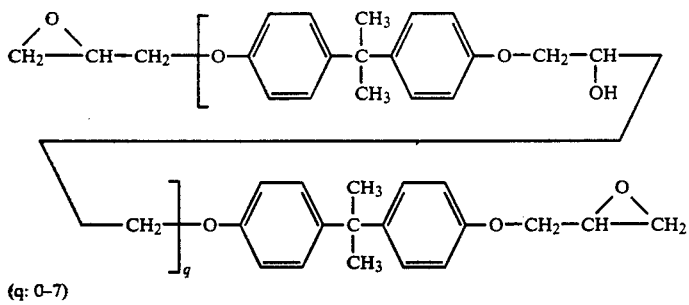

(q: 0-7)

Said polyepoxide compound may be partly reacted with polyol, polyether polyol, polyester polyol, polyamide amine, a polycarboxylic acid and polyisocyanate, and further, it may be graft polymerized with ε-caprolactone or an acrylic monomer, etc.

On the other hand, as a cationizing agent for introducing a cationic group to said polyepoxide compound, there may be cited an aliphatic, alicyclic or aromatic-aliphatic primary or secondary amine, tertiary amine salt, secondary sulfide salt and tertiary phosphine salt. These react with an epoxy group to produce a cationic group. It is further possible to introduce a cationic group by reacting a tertiary amino monoisocyanate obtained from a tertiary aminoalcohol and a diisocyanate, with a hydroxyl group of the epoxy resin.

As examples of the amine compound in said cationizing agent, for example, the following amines may be exemplified.

(1) Primary amines such as methyl amine, ethyl amine, n- or iso-propyl amine, monoethanol amine and n- or iso-propanol amine;

(2) Secondary amines such as diethyl amine, diethanol amine, di-n- or iso-propanol amine, N-methylethanol amine and N-ethylethanolamine; and (3) Polyamines such as ethylene diamine, diethylene triamine, hydroxyethylaminoethyl amine, ethylaminoethyl amine, methylaminopropyl amine, dimethylaminoethyl amine and dimethylaminopropyl amine.

Of these amines, alkanol amines having hydroxyl groups are preferable. Also, a primary amino group of polyamines may be reacted with ketone in advance to block said group, and then the remaining active hydrogen may be reacted with an epoxy group.

Further, besides said amine compounds, a basic compound such as ammonia, hydroxyl amine, hydrazine, hydroxyethyl hydrazine and a N-hydroxyethyl imidazoline compound may be used similarly. Basic groups formed by using these compounds may be protonated with an acid, especially preferably a water-soluble organic carboxylic acid such as formic acid, acetic acid, glycolic acid and lactic acid to be made into cationic groups.

Furthermore, tertiary amines such as triethyl amine, triethanol amine, N,N-dimethylethanol amine, N-methyldiethanol amine, N,N-diethylethanol amine and N-ethyldiethanol amine may be used, they may be protonated with an acid in advance, and then reacted with an epoxy group to be made into quaternary salts.

Besides the salts of tertiary amines, salts of sulfides such as diethyl sulfide, diphenyl sulfide, tetramethylene sulfide or thiodiethanol and boric acid, carbonic acid or an organic monocarboxylic acid may be reacted with an epoxy group to make them tertiary sulfonium salts.

In addition, salts of phosphines such as triethyl phosphine, phenyldimethyl phosphine, diphenylmethyl phosphine or triphenyl phosphine and such acids as mentioned above may be reacted with an epoxy group to make them quaternary phosphonium salts.

As hydroxyl groups of the base resin (A) used in the present invention, there may be cited, for example, primary hydroxyl groups of alkanol amines as said cationizing agent, of ring opened caprolactone and of general polyols; and secondary hydroxyl groups of epoxide resin. Of these, primary hydroxyl groups by alkanol amines are preferable because of excellent in crosslinking reactivity with the epoxy resin (B). As such alkanol amines, what is exemplified in said cationizing agent is preferable.

The content of hydroxyl groups in the base resin (A) is, from the point of view of the crosslinking reactivity with the epoxy group contained in the epoxy resin (B), preferably, calculated as a hydroxyl group equivalent, within the range of 20 to 5,000, especially 100 to 1,000. Especially, the primary hydroxyl group equivalent is preferably within the range of 200 to 1,000. The content of cationic groups is preferably in excess of the lower limit necessary for stably dispersing said base resin (A), and generally it is preferably within the range of 3 to 200, preferably from 5 to 130, especially from 10 to 80 calculated as amine value KOH mg/g the solids. However, even if the cationic group content is less than 3, it is possible to use it after making it an aqueous dispersion by the use of a surface active agent; in this case, however, it is desirable to adjust the cationic group so as to make the pH of the aqueous dispersed composition, usually 4 to 9, more preferably 6 to 7.

The base resin (A) used in epoxy curing CED paint has hydroxyl groups and cationic groups and is desirably free from free epoxy groups as a rule.

Next, an explanation will be made with reference to the epoxy resin (B) used in admixture with said base resin (A) as a curing agent.

Said epoxy resin (B) [which may be referred to hereinafter as "the curing resin (B)"] is a curing agent for forming a crosslinked paint film mainly by an etherification reaction with the base resin (A) as mentioned above, which contains at least 2, preferably at least 3, specified "epoxy functional groups" on average in one molecule.

Namely, said epoxy functional group in the curing resin (B) comprises an epoxy group directly bonded to an alicyclic ring and/or bridged alicyclic ring in which said alicyclic ring is a 4-10 member, preferably 5-6 member saturated carbon monocyclic or polycyclic ring, while said bridged alicyclic ring contains bridges (endmethylene, endethylene, etc.) of a straight chain (linear) or branched $C_{1-6}$ (preferably $C_{1-4}$) alkylene group (for example, —$CH_2$—, —$CH_2CH_2$—, —$CH(CH_3)$—, —$CH_2(CH_3)CH_2$—, —$C(CH_3)_2$—, —$CH(C_2H_5)CH_2$—, etc.) between 2 carbon atoms constituting said monocyclic or polycyclic ring.

On the other hand, an epoxy group

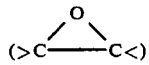

is important in that one of the carbon atoms in said epoxy group is directly bonded to the cyclic carbon atom (or atoms) of said alicyclic ring or said bridged alicyclic ring see, for example, the following formulae (I) and (II)], or the two carbon atoms of said epoxy group are common with the two adjoining carbon atoms constituting the ring in said alicyclic ring or said bridged alicyclic ring see, for example, the following formulae (III) and (IV)].

As the specific examples of such epoxy functional group, what is represented by the following formulae (I) to (IV) may be cited.

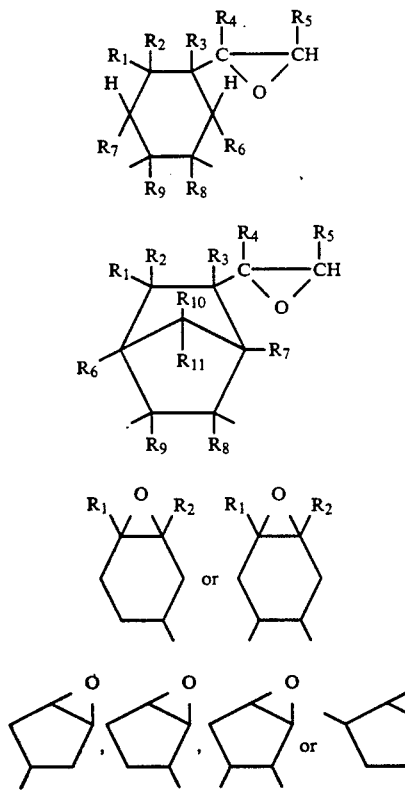

wherein
$R_1$, $R_2$, $R_3$, $R_5$, $R_6$, $R_7$, $R_{10}$ and $R_{11}$ represent H, $CH_3$ or $C_2H_5$, respectively, while $R_4$, $R_8$ and $R_9$ represent H or $CH_3$, respectively.

The epoxy resin (B) used in epoxy curing CED paint may have at least 2, preferably at least 3, more preferably at least 4, epoxy functional groups selected from said formulae (I) to (IV) on average in one molecule. For example, the epoxy resin (B) may have at least one kind of the epoxy functional group represented by said formula (I) or (II), or may have at least one kind of the epoxy functional group represented by said formula (III) or (IV) in one molecule. Furthermore, the epoxy resin (B) may have at least one kind of the epoxy functional group represented by said formula (I) or (II) and at least one kind of the epoxy functional group represented by said formula (III) or (IV) within one and same molecule or in different molecules.

Of the epoxy functional group represented by said formula (I) or (III) is preferable, and especially, an epoxy functional group represented by the following formula (V)

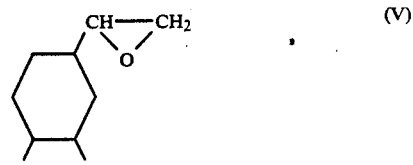

an an epoxy functional group represented by the following formula (VI) are preferable.

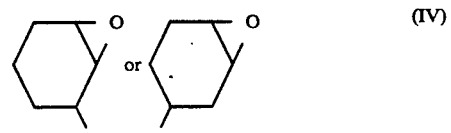

Additionally, the epoxy equivalent and the molecular weight of the epoxy resin (B) used in the present invention are not strictly restricted, but are changeable according to a process for the production thereof and the use of the end resin composition. But, generally speaking, the epoxy equivalent may be within the range of usually 100 to 2,000, preferably 150 to 500, more preferably 150 to 250.

And it is proper that the number average molecular weight is within the range of usually 400 to 100,000, preferably 700 to 50,000, more preferably 700 to 30,000.

The epoxy resin the curing resin (B)) having at least 2 such epoxy functional groups in one molecule is described in literatures such as, for example, Japanese Patent Publication No. 8016/1981 as well as Japanese Laid-Open Patent Publications Nos. 47365/1982, 166675/1985, 221121/1968 and 234028/1988, and what is known per se may be used.

Or said epoxy resin (B) having said epoxy functional groups is obtained by processes known per se. The main processes for producing said epoxy resin (B) will be enumerated hereinbelow, but the enumerated processes are not limitative.

A first process for the production:

A process for producing an epoxy resin having at least 2 epoxy functional groups in one molecule which comprises epoxidating part of carbon-carbon double bonds of an alicyclic compound having said at least 2 carbon-carbon double bonds in one molecule, subjecting the resulting epoxy groups to a ring-opening polymerization, and thereafter epoxidating said double bonds remaining in the resulting polymer.

A second process for the production:

A process for subjecting an alicyclic compound having at least 2 epoxy groups in the same molecule to a ring-opening polymerization to such an extent as may not eliminate all of said epoxy groups on the basis of said epoxy groups.

A third process for the production:

A process for polymerizing a compound having an epoxy functional group and a polymerizable unsaturated bond in the same molecule.

A more specific explanation will be made with reference to these processes for the production hereinbelow.

The First Process for the Production

This process comprises epoxidating part of carbon-carbon double bonds (a partial epoxidation product) contained in an alicyclic compound having at least 2 carbon-carbon double bonds in one molecule [hereinafter referred to as "the alicyclic compound (C)"], obtaining a ring-opened polymer of said partial epoxidation product by ring-opening polymerization of the resulting epoxy groups, and thereafter epoxidating part or whole of said double bonds remaining in said polymer to thereby obtain a curing resin (B).

The alicyclic compound (C) is a compound having a structure of an alicyclic ring or a bridged alicyclic ring mentioned above and at least 2 carbon-carbon double bonds, existing between 2 adjoining carbon atoms constituting the ring structure or between the other carbon atoms being directly bonded to said ring structure.

The alicyclic compound (C) may also be obtained by heating, for example, a conjugated diene compound by a known method. As such conjugated diene compound, an aliphatic or alicyclic compound having 4 to 30 carbon atoms and having at least 1 pair, preferably 1 to 5 pairs of conjugated double bonds in one molecule is suitable.

Specific examples of such conjugated diene compound include butadiene, isoprene, pirylene, 1,3-hexadiene, 2,4-hexadiene, 2,4-heptadiene, 2-methyl-6-methylene-2,7-octadiene, 2,6-dimethyl-1,5,7-octatriene, cyclopentadiene, cyclohexadiene, 4-ethyl-2-methylcyclopentadiene, 3-isopropyl-1-methylcyclopentadiene, 5-isopropylcyclopentadiene, 1,2,3,4-tetraphenylcyclopentadiene, 1,2,4-triphenylcyclopentadiene, 1,4-diphenylcyclopentadiene, 1,3-octachloropentadiene, hexachlorocyclopentadiene, 5,5-diethoxy-1,2,3,4-tetrachlorocyclopentadiene, 1,2,3,4,5-pentachlorocyclopentadiene, 1,2,3,4-tetrachlorocyclopentadiene, 1,3-cycloheptadiene, 1,3-cyclooctadiene, 1,3,5-cyclooctatriene, 1,3,6-cyclooctatriene, cyclooctatetraene, chlorocyclooctatetraene, bromocyclooctatetraene and 5-cyclohexylidenecyclopentadiene. These conjugated diene compounds may be used singly or in combination, respectively.

As required, when a conjugated diene compound under heating is reacted in the presence of a Ziegler catalyst, the alicyclic compound (C) is obtained. This reaction under heating may be carried out by a method known per se, for example, by a method disclosed in Japanese Laid-Open Patent Publication No. 102643/1974.

When typical examples of the so obtained alicyclic compound (C) are shown, they are as follows.

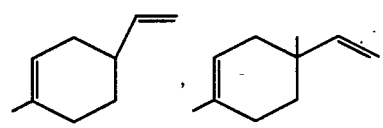

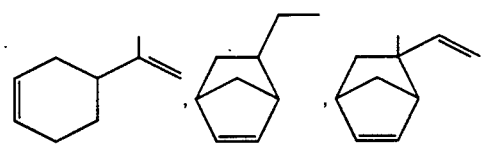

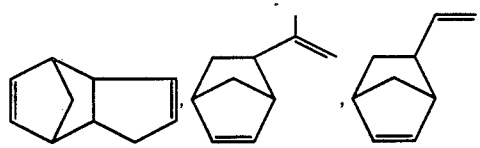

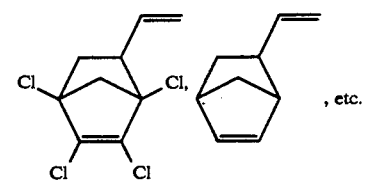

Of the aforesaid conjugated diene compounds, alicyclic compounds such as cyclopentadiene, cyclohexadiene and 4-ethyl-2-methylcyclopentadiene; and such compounds as sylvestrene, 2,8(9)-p-menthadiene, pyronene, 1,3-dimethyl-1-ethyl-3,5-cyclohexadiene, terpinene, phellandrene, dipentene, iso-limonene and limonene have already structures of the alicyclic compound (C), therefore, these compounds may be used per se without being subjected to said reaction under heating.

At first, part of (at least 2) carbon-carbon double bonds contained in the alicyclic compound (C) is modified to epoxy groups with a peroxide and so forth (partial epoxidation). The partial epoxidation product is obtained by modifying part of a plurality of double bonds contained in said alicyclic compound (C) to epoxy groups. When specific examples of such partial epoxidation product are shown, they are as follows.

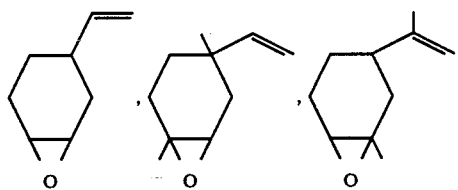

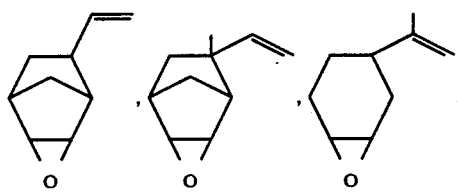

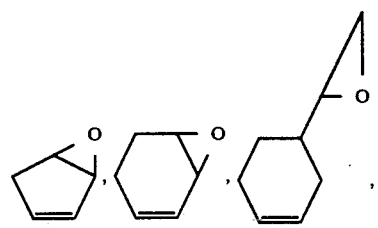

-continued

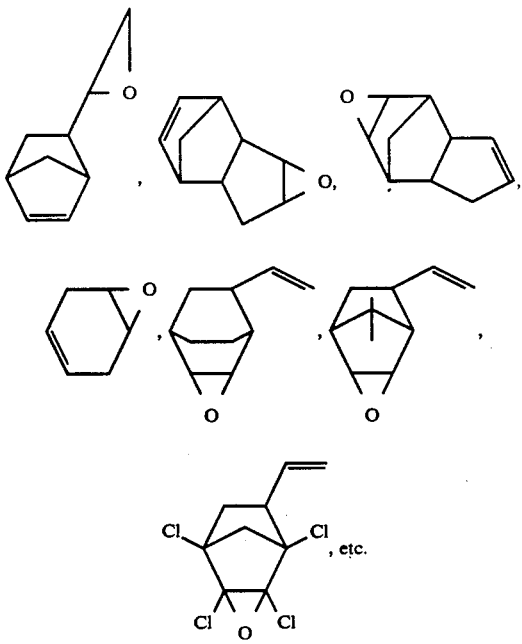

Naturally available epoxy carene may also be used as a partial epoxidation product.

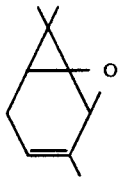

A partial epoxidation product has at least 1 epoxy group and at least 1 carbon-carbon double bond in one molecule, and said double bond is required to exist between 2 adjoining carbon atoms constituting the ring or between the other carbon atoms directly bonded to said ring.

Next, based on epoxy groups in this partial epoxidation product, a ring-opening polymerization is carried out to obtain a polymer of the alicyclic compound (C). It is preferable to use a polymerization initiator for this ring-opening polymerization, and the terminal of the end product of the curing resin (B), a residue X by the initiator component(s) may be bonded, where X is a residue of an organic compound having active hydrogen. As an organic compound having active hydrogen which is a precursor of X, there may be cited, for example, alcohols, phenols, carboxylic acids, amines and thuiols. Of these, as the alcohols, either one or monohydric alcohols or di- or higher polyhydric alcohols will do. Specific examples of the alcohols include aliphatic monohydric alcohols such as methanol, ethanol, propanol, butanol, pentanol, hexanol and octanol; an aromatic monohydric alcohol such as benzyl alcohol; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, hydroxypivalic acid neopentyl glycol ester, cyclohexane dimethanol, glycerin, polyglycerin, trimethylol propane, trimethylol ethane, pentaerythritol and dipentaerythritol.

Specific examples of the phenols include phenol, cresol, catechol, pyrogallol, hydroquinone, hydroquinone monomethylether, bisphenol A, bisphenol F, 4,4'-dihydroxybenzophenone, bisphenol S, phenol resin and cresol novolak resin.

As the carboxylic acids, there may be illustrated formic acid, acetic acid, propionic acid, butyric acid, fatty acid of animal and vegetable oils; fumaric acid, maleic acid, adipic cid, dodecanoic diacid, trimellitic acid, pyromellitic acid, polyacrylic acid, phthalic acid, isophthalic acid and terephthalic acid, and further, a compound having both hydroxyl group and a carboxylic acid such as lactic acid, citric acid and hydroxycaproic acid may be used as well.

Besides, as the other compound having active hydrogen, a mixture of water and alkoxysilane such as tetramethyl silicate, tetraethyl silicate, methyltrimethoxysilane, methyltriethoxysilane, dimethyl dimethoxysilane and phenyl trimethoxysilane or silanol compounds of these; polyvinyl alcohol, a polyvinyl acetate partial hydrolyzed product, starch, cellulose, cellulose acetate, cellulose acetate butyrate, hydroxyethyl cellulose, acrylpolyol resin, styrene-allyl alcohol copolymer resin, styrene-maleic acid copolymer resin, alkyd resin, polyesterpolyol resin and polycaprolactonepolyol resin may be also used. Such compound may have an unsaturated double bond together with active hydrogen, further, said unsaturated double bond may be epoxidated. And a catalyst and a polymerization initiator may be the same like an alkoxy metal compound. Usually, the aforesaid organic compound having active hydrogen is used as a polymerization initiator, while the aforesaid partial epoxidation product such as, for example, 4-vinylcyclohexene-1-oxide, 4-vinylcyclo2,2,1-3-methyl-4(or 5)-t-propenyl-1-cyclohexene oxide, 2,4- or 1,4-dimethyl-4-ethenyl-1-cyclohexene oxide, 4-vinylcyclo2,2,1]-heptene-1-oxide (vinylnorbornene oxide) and 2-methyl-4-isopropanyl-cyclohexene oxide are used singly or in combination upon carrying out a ring-opening polymerization. At this time, it is also possible to carry out a ring-opening polymerization in the co-presence of the other epoxy compound but belonging to said partial epoxidation product. As the other copolymerizable epoxy compound, any compound will do so long as it has an epoxy group, but suitable examples of such other copolymerizable epoxy compound include an oxide of an unsaturated compound such as ethylene oxide, propylene oxide, butylene oxide and styrene oxide; a glycidyl ether compound such as allylglycidyl ether, 2-ethylhexylglycidyl ether, methylglycidyl ether, butylglycidyl ether and phenylglycidyl ether; unsaturated organic carboxylic acid glycidyl ester compound such as acrylic acid and methacrylic acid; and an alicyclic oxiran group-containing vinyl monomer such as 3,4-epoxycyclohexyl methyl (meth)acrylate.

The aforesaid ring-opened polymer is obtained by ring-opening polymerizing epoxy groups contained in a partial epoxidation product alone or as required in the other epoxy compound made to be co-present with said partial epoxidation product to form an ether bond. The proportion of the other epoxy compound in a ring-opened polymer may be optionally selected in accordance with the object, but specifically, it is desirable to select said epoxy compound within such a range of proportion that said compound may have at least 2, preferably at least 3, more preferably at least 4, of one or more kinds of said structural formulae (I) to (IV) on average per molecule of the resulting ring-opened polymer. It is preferable that the number average molecular weight of the so obtained (co)polymer is within the range of usaully from 400 to 100,000, especially from 700 to 50,000, more especially 700 to 30,000.

It is generally preferable to carry out a ring-opening polymerization reaction in the presence of a catalyst.

Specific examples of the catalyst that can be used include amines such as methyl amine, ethyl amine, propyl amine and piperazine; organic bases such as pyridines and imidazoles; organic acids such as formic acid, acetic acid and propionic acid; inorganic acids such as sulfuric acid and hydrochloric acid; alkali metal alcoholates such as sodium methylate; alkalis such as KOH and NaOH: Lewis acid or its complexes such as $BF_3$, $ZnCl_2$, $AlCl_3$ and $SnCl_4$; and organometallic compounds such as triethyl aluminum, aluminum acetyl acetonate, titanium acetyl acetonate and diethyl zinc.

These catalysts may be used in amounts within the range of generally 0.001 to 10 % by weight, preferably 0.1 to 5 % by weight based on the reactant. The ring-opening polymerization temperature is within the range of generally about $-70°$ to about 200° C., preferably about $-30°$ to about 100° C. The reaction may be carried out in the presence of a solvent, and it is preferable to use an ordinary organic solvent not having active hydrogen as a solvent.

In the ring-opened polymer, there are double bonds derived from the alicyclic compound (C), and the epoxy resin (B) is obtained by epoxidating part or whole of said double bonds. Epoxidation of the double bonds may be carried out by using an epoxidation agent such as, for example, peroxy acids and hydroperoxides. Whether a solvent should be used or not and the reaction temperature in the epoxidation reaction may be properly adjusted according to the apparatus used and the physical properties of the starting material. Depending on the conditions of the epoxidation reaction, simultaneous with epoxidation of the double bonds in the ring-opened polymer as a starting material, a side reaction occurs and the modified substituent may be contained in the skeleton of the epoxy resin sometimes. As such modified substituent, when, for example, peracetic acid is used as the epoxidation agent, a substituent of the following structure may be cited, which is considered to be attributable to reaction of the produced epoxy group with the by-produced acetic acid.

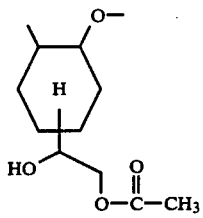

The ratio at which these substituents are contained in said skeleton is determined according to the kind of the epoxidation agent, the molar ratio of the epoxidation agent to the unsaturated bond and the reaction conditions.

The epoxy equivalent of the so obtained epoxy resin (B) is preferably within the range of generally 100 to 2,000, especially 150 to 500, more especially 150 to 250.

As such epoxy resin (B), what is commercially available may also be used, and as such merchandise, for example, EHPE-3150, EHPE-3100 and EHPE-1150 (trade names of products of Daicel Chemical Industries, Ltd.) may be cited. These are epoxy resins of the following structural formula having cyclohexene skeletons using 4-vinylcyclohexene-1-oxide as a partial epoxidation product for their production.

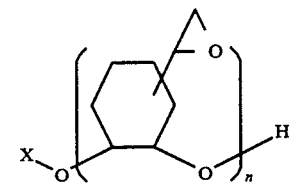

wherein n is at least 2, preferably at least 3, more preferably at least 4.

The Second Process for the Production

According to this process, the objective epoxy resin is obtained by, for example, epoxidating at least 2 double bonds of the double bonds contained in said alicyclic compound (C), and thereafter subjecting said compound (C) to a ring-opening polymerization in such a manner as to retain the resulting epoxy groups.

As said epoxidation product having at least 2 epoxy groups on average per molecule, the following monocyclic or condensed ring-type compounds may be shown as typical examples.

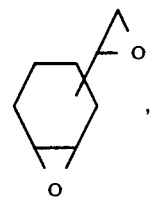

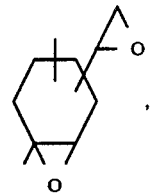

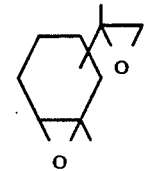

(For example, a product under a trade name of "Celoxide" of Daicel Chemical Industries, Ltd. may be cited),

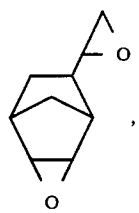,

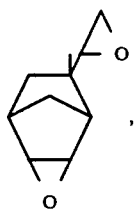,

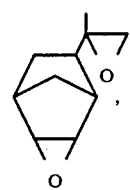,

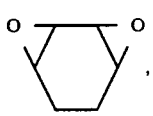,

,

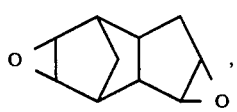,

-continued

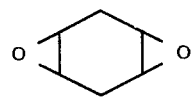

Specifically, at least one kind of said epoxy compound is subjected to a ring-opening polymerization, as required in the presence of a polymerization initiator and a catalyst in the same way as in the first process for the production mentioned above and the reaction is suspended at the predetermined reaction stage in which epoxy groups are remaining to thereby obtain the epoxy resin (B). For suspending the reaction, optional means such as dilution with a solvent and cooling may be used.

In this process for the production, said other epoxy compound may be copolymerized as in said first process for the production as well.

The so obtained curing resin (B) may be an epoxy resin having at least one kind of the epoxy functional group shown by said formula (I) or (II) and at least one kind of the epoxy functional group shown by said formula (III) or (IV) in the same molecule or different molecules.

The so obtained ring-opened polymer the curing resin (B) preferably has a number average molecular weight within the range of generally 400 to 100,000, especially 700 to 50,000 and conveniently has an epoxy equivalent within the range of generally 100 to 2,000, especially 150 to 500, more especially 150 to 250.

The Third Process for the Production

As a compound having at least one epoxy functional group and a polymerizable unsaturated bond in the same molecule (which may be hereinafter referred to as "a polymerizable epoxy monomer"), there may be cited, for example, what is represented by the following general formulae ①to ⑫.

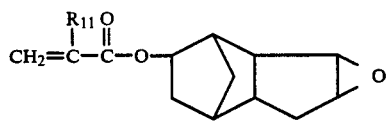 (1)

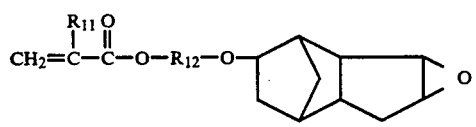 (2)

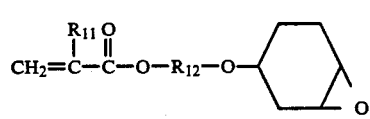 (3)

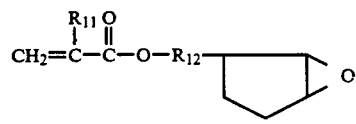 (4)

-continued

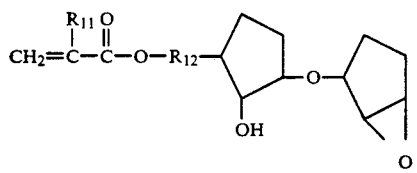 (5)

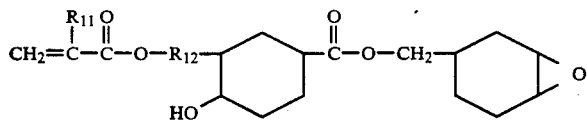 (6)

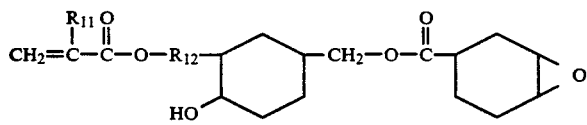 (7)

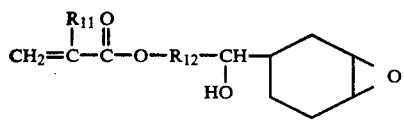 (8)

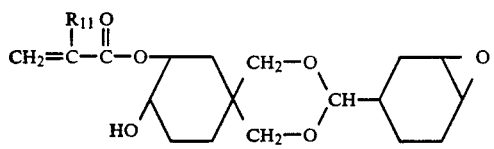 (9)

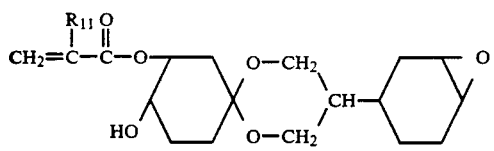 (10)

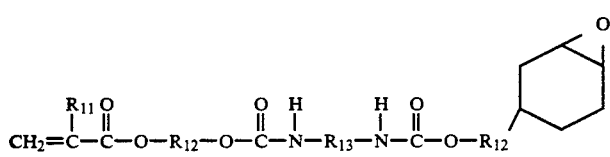 (11)

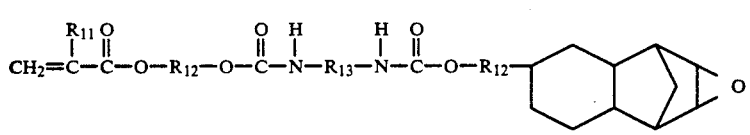 (12)

In said general formulae, $R_{11}$ represents a hydrogen atom or a methyl group, $R_{12}$ represents a divalent aliphatic saturated hydrocarbon group having 1 to 6 carbon atoms, and $R_{13}$ represents a divalent hydrocarbon group having 1 to 10 carbon atoms.

In the aforesaid copolymerizable epoxy monomers, as a divalent aliphatic saturated hydrocarbon group having 1 to 6 carbon atoms represented b $R_{12}$, there may be cited a straight chain linear or branched chain alkylene group such as, for example, methylene, ethylene, propylene, tetramethylene, ethylethylene, pentamethylene and hexamethylene. As a divalent hydrocarbon group having 1 to 10 carbon atoms represented by $R_{13}$, there may be cited, for example, methylene, ethylene, propylene, tetramethylene, ethylethylene, pentamethylene, hexamethylene, polymethylene, phenylene,

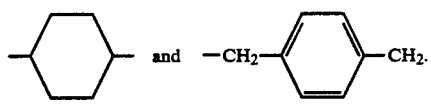

Specific examples of the polymerizable epoxy monomers represented by the aforesaid general formulae (1) to (12) include 3,4-epoxycyclohexylmethyl acrylate and 3,4-epoxycyclohexylmethyl methacrylate. They are commercially available, for example, under trade names of "METHB" and "AETHB", both products of Daicel Chemical Industries, Ltd. They have the epoxy functional group represented by said formula (I) or (II). Further, 4-vinylcyclohexene oxide may also be used as a polymerizable epoxy monomer.

The epoxy resin (B) may be produced by polymerizing one kind or at least two kinds of monomers selected from these polymerizable epoxy monomers, and at this time, it is also possible to copolymerize the other polymerizable unsaturated monomer.

As said the other polymerizable unsaturated monomer, it may be selected from a broad range according to the properties desired of the resulting (co)polymer. Typical examples of such other polymerizable unsaturated monomer include the following compounds.

(a) Acrylic acid or methacrylic acid esters: for example, alkyl esters having 1 to 18 carbon atoms of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; alkoxyalkyl esters having 2 to 18 carbon atoms of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; alkenyl esters having 2 to 8 carbon atoms of acrylic acid or methacrylic acid such as allyl acrylate and allyl methacrylate; hydroxyalkyl esters having 2 to 8 carbon atoms of acrylic acid or methacrylic acid such as 2-hydroxyethyl acrylate, 2-hydroxyethyl methacrylate, hydroxypropyl acrylate and hydroxypropyl methacrylate; and alkenyloxyalkyl esters having 3 to 18 carbon atoms of acrylic acid or methacrylic acid such as allyloxyethyl acrylate and allyloxyethyl methacrylate.

(b) Vinyl aromatic compounds: for example, styrene, alpha-methyl styrene, vinyl toluene and p-chlorostyrene.

(c) Polyolefin type compounds, for example, butadiene, isoprene and chloroprene.

(d) Others: acrylonitrile, methacrylonitrile, methylisopropenyl ketone, vinyl acetate VEOBA monomer (a product of Shell Chemicals), vinyl propionate, vinyl pivalate and a compound having a polycaprolactam chain (for example, FM-3X monomer, a trade name of a product of Daicel Chemical Industries, Ltd.)

The ratio of the polymerizable epoxy monomer to the other polymerizable unsaturated monomer may be optionally selected according to the object, within such a range as to enable the epoxy resin (B) obtained by these copolymerization reactions to contain at least 2, preferably at least 3, more preferably at least 4, epoxy functional groups on average in one molecule. But in order to invest the resulting polymer with sufficient curability, it is especially preferable to make the content of the polymerizable epoxy monomer in the solids content of said epoxy resin (B) within the range of 5 to 100% by more preferably 20 to 100% by weight.

Said third process for the production of the epoxy resin (B) may be carried out in the same manner as the polymerization reaction of ordinary acryl or vinyl resin monomers. As one of such polymerization reactions, a process which comprises dissolving or dispersing the respective monomer components in an organic solvent, and heating the resulting solution or dispersion at a temperature of about 60° to 180° C. with stirring in the presence of a radical polymerization initiator, may be shown.

The reaction time may be normally about 1 to 10 hours. As the organic solvent, alcohol solvents, ether solvents, ester solvents and hydrocarbon solvents may be used. When the hydrocarbon solvent is used, it is preferable to use another cosolvent together with it from the standpoint of the solubility. Further, all of usually used radical polymerization initiators may be used. As the specific examples of such radical initiator, there may be exemplified peroxides such as benzoyl peroxide and t-butyl peroxy-2-ethyl hexanoate; and azo compounds such as azobisisobutyronitrile and azobisdimethylvaleronitrile.

It is preferable that the epoxy resin (B) obtained by said third process for the production has a number average molecular weight within the range of generally about 3,000 to about 100,000, especially 4,000 to 10,000.

Of the aforesaid curing resins (B), the epoxy resin is most suitable having at least 3 epoxy functional groups, more preferably at least 4 such groups, most preferably at least 5 such groups, on average per molecule, having an epoxy equivalent within the range of preferably 100 to 2,000, more preferably 150 to 500, especially preferably 150 to 250, and a number average molecular weight within the range of preferably 400 to 100,000, more preferably 700 to 50,000, especially preferably 750 to 30,000.

Particularly preferred epoxy functional group-containing curing resins among the above-mentioned curing resins (B) include an epoxy resin containing 2 to 30 recurring units represented by the following formula.

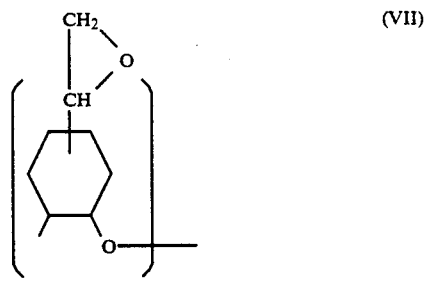

(hereinafter sometimes abbreviated as "curing resin (B-1)"), and a polymer which has the recurring unit represented by the following formula (VIII).

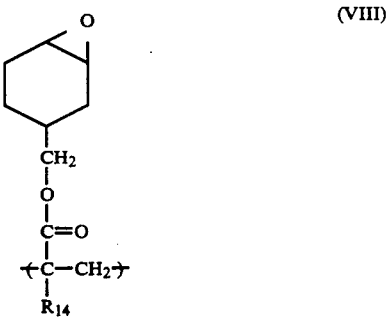

wherein $R_{14}$ is a hydrogen atom or methyl group, and has a number average molecular weight of 200,000 or less (hereinafter sometimes abbreviated as "curing resin (B-2)").

More specifically, there can, for example, be used as the curing resins (B-1) those per se known and disclosed in Japanese Laid-Open Patent Publication Nos. 170620/1985, 135467/1987, 166675/1985, 161973/1985, etc.

The above curing resin (B-1) can have at the terminal the residue X of the polymerization initiation component as indicatged in the following formula (IX).

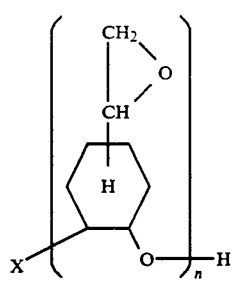

(IX)

wherein n is an integer of 2 to 30, and X is an organic substance residue having active hydrogen as stated in the above first process for production.

Curing resin (B-1) can specifically be prepared usually by epoxidizing with an oxidizing agent such as peracid a polyether resin obtained by subjecting 4-vinylcyclohexene-1-oxide to ring opening polymerization using the above organic compound having active hydrogen as an initiator, namely polycyclohexene oxide ring opening polymer having vinyl side chains.

4-vinylcyclohexene-1-oxide can for example be obtained by partially epoxidizing with peracetic acid of vinylcyclohexene obtained by dimerization reaction of butadiene. It is generally be preferred to use a catalyst when 4-vinylcyclohexene-1-oxide is subjected to ring opening polymerization in the presence of active hdyrogen, and there can be exemplified as usable catalysts those mentioned as catalysts for ring opening polymerization reaction in the above first process for production. These catalysts can be used in the range of 0.001 to 10% by weight, preferably 0.1 to 5% by weight based on the reactant. Reaction temperature of the ring opening reaction is generally $-70°$ to 200° C. preferably $-30°$ to 100° C. The reaction can be carried out using solvent, and it is preferred to use as the solvent usual solvent having no active hydrogen. Further, in some case it is possible to copolymerize monoepoxide such as epoxidized product of alpha-olefin besides 4-vinylcyclohexene oxide.

There can be obtained curing resin (B-1) of the formula (VII) by epoxidizing the vinyl group side chains which polycyclohexene oxide ring opening polymer having vinyl group side chains thus synthesized has, and the opoxidation can be carried out using peracid, hydroperoxide or the like. There can for example be used as peracids performic acid, peracetic acid, perbenzoic acid, trifluoroperacetic acid, etc. and as hydroperoxides such as hydrogen peroxide, tert-butyl peroxide, cumene peroxide, etc. The epoxidation reaction can be carried out, if necessary, using catalyst. Use or no use of solvent and reaction temperature in the epoxidation reaction can suitably be adjusted in accordance with apparatus to be used and physical properties of the raw material. There is a case where substituents represented by the following formula (X) in the raw material polymer and/or substituents formed represented by the following formula (XI) are involved, at the same time with epoxidation of vinyl group in the raw material, in side reaction with the epoxidizing agent and the like, according to conditions of the epoxidation reaction, and as a result modified substituents are formed and contained in curing resin (B-1).

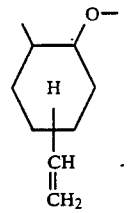

(X)

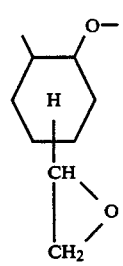

(XI)

Ratio in which these modified substituents are contained is determined by kind of epoxidizing agent, molar ratio of the epoxidizing agent to the vinyl groups and reaction conditions.

It is also possible to use commercially available product as curing resin (B-1), and for example EHPE 3150 (trade name produced by DAICEL CHEMICAL INDUSTRIES, LTD.) is mentioned.

Next, there can be used as curing resins (B-2) polymers of number average molecular weight of 200,000 or less having recurring unit represented by the following formula.

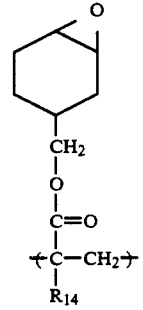

(VIII)

wherein $R_{14}$ is a hydrogen atom or methyl group.

Curing resin (B-2) can usually be prepared by polymerizing at least one selected from monomers represented by the following general formula (XII).

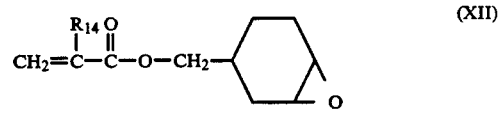

(XII)

wherein $R_{14}$ is as hereinbefore defined, or polymerizing at last one of the monomers and another polymerizable monomer. Specific examples of monomers represented by the above formula (XII) include 3,4-epoxycyclohexylmethyl acrylate, 3,4-epoxycyclohexylmethyl methacylate, etc. There can for example be mentioned as these commercial product METHB, AETHB (they are trade names) produced by DAICEL CHEMICAL INDUSTRIES, LTD.

Another polymerizable monomer capable of copolymerizing with monomer represented by the above formula (XII) can widely be selected according to desired performances, and those exemplified in the above third process for production can be mentioned.

Use amount of monomer represented by the above formula (XII) in curing resin (B-2) is selected within such range that at least 2, preferably at least 3, more preferably at least 4 monomers are contained in one molecule of the resin (B-1). More specifically, it is preferred to determine the use amount so that it comes to become at least 50% by weight, preferably 70 to 100% by weight, more preferably 80 to 100% by weight in solid matter of curing resin (B-2) based on the crosslinking density of cured paint film and curing speed.

The above curing resin (B-2) can be prepared in the same manner as in the above third process for production.

The amount to use the curing resin (B) is properly changeable according to the kind of the base resin (A) used and within the range from the minimum amount enough to cure the resulting paint film thermally to the maximum amount not hurt the bath stability, but generally it is desirably within such a range that the weight ratio of the solids content of the curing resin (B) to the base resin (A) becomes 0.1 to 1.5 especially 0.15 to 1.0, more desirably 0.2 to 0.8.

The epoxy curing CED paint may contain the curing resin (B) together with the base resin (A) in advance.

Thus, the composition comprising the base resin (A) and the curing resin (B) may be used as a resin for a cathodically electrodepositable paint.

For preparing the resin composition for a cathodically electrodepositable paint, for example, the base resin (A) and the curing resin (B) are mixed, then the resulting mixture is stably dispersed in water. Then, as required, the resulting aqueous dispersion is added with a color pigment such as carbon black, titanium white, white lead, lead oxide and red iron oxide; an extender pigment such as clay and talc; an anticorrosive pigment such as strontium chromate, lead chromate, basic lead chromate, litharge, red lead, lead silicate, basic lead silicate, lead phosphate, basic lead phosphate, lead tripolyphosphate, lead silicochromate, chrome yellow, lead cyanamide, calcium plumbate, lead suboxide, lead sulfate and basic lead sulfate; or further with other additives. As the other additives that can be added, for example, a small amount of a dispersant or a nonionic surface active agent as a cissing preventing agent of the coated surface; and curing promotor may be cited.

According to the present invention, in preparation of the above resin compositions for the cationically electrodepositable paint lead hydroxide and/or lead maleate are(is) incorporated as curing catalyst in the resin composition.

Method to incorporate lead hydroxide and/or lead maleate in the resin composition is not particularly limited, and it is possible to compound those of powdery or granular state as they are. For example, it is possible to disperse lead hydroxide and/or lead maleate alone or together with another pigment in pigment-dispersing resin or the like in a ball mill, and then to compound the dispersion in the resin for cationically electrodepositable paint.

However, in order to uniformly and stably disperse lead hydroxide or lead maleate in a fine particle state in the cationically electrodepositable paint composition, it is generally preferred to make the dispersion according to the following process.

Lead hydroxide and/or lead maleate are(is) dispersed in organic solvent to give a uniform suspension, water dispersible resin capable of cationic electrodeposit painting is added to the suspension for neutralization, and the mixture is compounded in the cationically electrodepositable paint composition.

Organic solvent to disperse lead hydroxide and/or lead maleate is not particularly limited, and there can be used those compounded in usual paints, for example, hydrocarbon type, alcoholic, ketone type, etherial, ester type and other type solvents, and, above all, it is preferred to use alcoholic organic solvents for obtaining stable suspension. Examples of such alcoholic solvents include monovalent alcohols such as methanol, ethanol, isopropanol, n-propanol, n-butanol, isobutanol, tert-butanol, pentanol, 2-ethylhexanol and benzyl alcohol; glycols such as ethylene glycol, diethylene glycol and propylene glycol; monoalkyl etherified glycols such as ethylene glycol monomethyl ether, ethylene glycol monoethyl ether, ethylene glycol monopropyl ether, ethylene glycol monobutyl ether, ethylene glycol monohexyl ether, ethylene glycol mono-2-ethylhexyl ether, propylene glycol monomethyl ether, propylene glycol monoethyl ether, propylene glycol monobutyl ether, diethylene glycol monomethyl ether, diethylene glycol monoethyl ether and diethylene glycol monobutyl ether.

In suspension consisting of lead hydroxide and/or lead maleate and an organic solvent, suitable constituent ratio of the both components is such that the amount of lead hydroxide and/or lead maleate is 1 to 90% by weight, preferably 5 to 40% by weight, and the amount of the organic solvent is 99 to 10% by weight, preferably 95 to 60% by weight.

Mixing of both the components can be carried out in a method known per se, and it is preferred that mixing temperature is in the range of room temperature to 250° C., particularly 50° to 150° C. When the above alcoholic solvent is used as the organic solvent, there arise advantages that the suspension of coarse particles of lead hydroxide and/or lead maleate changes into a very stable suspension, and moreover this suspension is stable for a fairly long term even when allowed to stand and a small amount of the percipitate can easily be redispersed.

It is preferred that water dispersible resin compounded in the suspension has cationic groups which make cationic electrodeposition painting possible, and there can specifically be used those so far known in the technical field but it is desirable to use the aforementioned substrate resin (A) having hydroxyl and cationic groups. Mixing of the suspension with the water dispersible resin can be made according to any method without particular limitation, suitable temperature of the mixing is in the range of the order of 20° to 90° C. Although mixing ratio of both the components is not limited, it is suitable that the amount of lead hydroxide and/or lead maleate is in the range of 1 to 80% by weight, preferably 2 to 50% by weight, particularly preferably 10 to 35% by weight, in terms of the amount of lead metal.

Although the mixture of the suspension and the water dispersible resin is compounded in the cationically electrodepositable paint composition, it is preferred before the step to neutralize the water dispersible resin in the mixture with acid to give a water suspension. Any acid can be used to neutralize the water dispersible resin, but preferred are acids having a dissociation constant PKa less then 4 and a high hydrophilicity, for example formic acid. Since such acids are present stabler in water as continuous layer than inside the dispersed particles containing lead hydroxide and/or lead maleate, they facilitate water dispersion and there is no such case where they have bad effects on the cationically electrodepositable paint by reacting with lead hydroxide and/or lead maleate during long-term storage of the paint. Neutralization of the water dispersible resin may be performed before or after compounding the resin into the suspension.

The content of total of lead hydroxide and/or lead maleate in the cationically electrodepositable paint composition can optionally be selected according to the objection, but it is preferred in general to adjust the content so as to become 0.05 to 15% by weight, preferably 0.5 to 10% by weight, more preferably 0.5 to 5% by weight, in terms of metal lead based on the resin solid matter of the composition.

A method of forming an electrodeposited paint film on the substrate using the resin composition for a cathodically electrodepositable paint of the present invention is not particularly restricted, but ordinary conditions for cathodically electrodepositing may be used. For example, the base resin (A) and the epoxy curing resin (B) according to this invention are, as mentioned above, dispersed in water, the resulting aqueous dispersion is blended with, as required, pigments, a curing catalyst and other additives, further, the mixture is diluted to the concentration of the solids content of the bath within the range of 5 to 40% by weight, preferably 10 to 25% by weight, and the bath pH is adjusted within the range of 5 to 8, preferably 5.5 to 7. Next, using this electrodeposition bath, electrodeposition is carried out under the following conditions with, for example, a carbon plate (5 cm×15 cm×1 cm) being used as an anode and for example, a zinc phosphated steel (5 cm×15 cm×0.7 mm) being used as a cathode.

Bath temperature: 20° to 35° C., preferably 25° to 30° C.

Direct current

Current density: 0.005 to 2 A/cm$^2$, preferably 0.01 to 1 A/cm$^2$

Voltage: 10 to 500V, preferably 100 to 300V

Power feeding time: 0.5 to 5 min., preferably 2 to 3 min.

After the electrodeposition coating, the coated object is drawn up from the electrodeposition bath, rinsed with water, and then cured thermally by heating.

The thickness of a paint film obtained by electrodepositing the resin composition for a cathodically electrodepositable paint on a proper substrate is not strictly restricted, however, generally, the thickness within the range of 3 to 300 microns based on the cured paint film is suitable, and the paint film can be cured with heating at a temperature of, for example, 70° to 250° C., preferably 120° to 160° C.

Hereinbelow, the present invention will be illustrated more specifically by examples. All parts and percentages in the following examples are by weight.

EXAMPLE 1

Bisphenol A type epoxy resin of an epoxy equivalent of 950 (trade name "Epicoat 1004" produced by SHELL CHEMICAL COMPANY)(1900 parts) was dissolved in 993 parts by butylcellosolve, 210 parts of diethanolamine (cationizing agent) was added dropwise thereto at 80° to 100° C., and the mixture was held at 100° C. for 2 hours to obtain a solution (solid content 68%) of epoxy resin-amine adduct having an amine value of 53 substrate resin (A-1)]. 88% formic acid (3.2 parts) was added to 100 parts of a solution of this substrate resin (A-1) for neutralization. The resulting product has a primary hydroxyl value of 106 and cationic group of 53 KOH (mg/mg solid matter) and scarcely contains free epoxy groups.

Separately, 32.6 parts of EHPE 3150 epoxy equivalent 175 to 195, an epoxy resin produced by DAICEL CHEMICAL INDUSTRIES, LTD.]and 8.2 parts of propylene glycol monomethyl ether were dissolved with heating at 100° C. to obtain 40.8 parts of a curing resin (B-1) solution having a solid content of 80% and an epoxy equivalent of 190. This solution was added together with 356 parts of deionized water to 103.2 parts of formic acid-neutralized product of the above substrate resin (A-1) solution with stirring to obtain 500 parts of a 20% cationically electrodepositable paint.

Then, 15.24 parts of ethylene glycol monobutyl ether was added to 2.69 parts of lead hydroxide [Pb(OH)$_2$] and the mixture was gradually heated to 90° C. with enough stirring whereby the white turbid mixture changed to a palely whitish suspension. After stirring at 90° C. for 30 minutes, the suspension was cooled to room temperature to obtain a suspension of lead hydroxide. This suspension (17.93 parts) was gradually added dropwise to 17.65 parts of the above substrate resin (A-1) solution with stirring, and then 0.59 parts of 88% formic acid and 23.8 parts of deionized water were added with continued stirring to obtain 60 parts of an 20% emulsion containing 20 parts of lead hydroxide in terms of metal lead per 100 parts of the substrate resin solid matter (20% as the concentration of resin solid matter). This emulsion was mixed with 500 parts of the above 20% cationically electrodepositable paint to obtain a cationically electrodepositable bath of pH 5.5.

EXAMPLE 2

Ethylene glycol monoethyl ether (42 parts) was added to 4.67 parts of lead hydroxide [Pb(OH)$_2$], followed by gradual heating with enough stirring. After maintenance at 120° C. for 1 hour the mixture was cooled to room temperature. The resulting lead hydroxide suspension (26.9 parts) was added dropwise to 35.3 parts of the epoxy resin-amine adduct solution of Example 1 with stirring. Then, 0.65 parts of 88% formic acid was added, and 58.5 parts of deionized water was added thereto with stirring to obtain 120 parts of 20% emulsion (as concentration of the resin solid matter) containing 10 parts of lead hydroxide in terms of metal lead per 100 parts of the resin solid matter. This emulsion was mixed with 500 parts of the 20% cationically electrodepositable paint of Example 1 to obtain a cationically electrodepositable bath of pH 5.6.

In this Example 2 the curing resin (B-1) in Example 1 was changed for the following curing resin (B-2) of the identical amount in terms of the solid matter.

Curing resin (B-2)

A solution of 2 parts of azobisdimethylvaleronitrile in 33.4 parts of METHB (3,4-epoxycyclohexylmethyl methacrylate) was added dropwise to a 100° C.—heated mixed solvent of 10 parts of methyl isobutyl ketone and 10 parts of butylcellosolve over a period of 2 hours. After adding for one hour, the mixture was heated to 125° C. and further aged for 1 hour to obtain 54 parts of a solution of curing resin (B-2) having an epoxy equivalent of 196.

EXAMPLE 3

Monoethanolamine (39 parts) was held at 60° C. in a reaction vessel, 100 parts of N,N-dimethylaminopropyl-acrylamide was added dropwise, and reaction was carried out at 60° C. for 5 hours to obtain a monoethanolamine adduct of N,N-dimethylaminopropyl-acrylamide.

Separately, 950 parts of bisphenol A diglycidyl ether having an epoxy equivalent of 190, about 340 parts of propylene glycol diglycidyl ether having an epoxy equivalent of about 340, 456 parts of bisphenol A and 21 parts of diethanolamine were charged in a vessel. The mixture was heated up to 120° C. to react until the epoxy value because 1.02 m moles/g, diluted with 479 parts of ethylene glycol monobutyl ether, and cooled. While the temperature of the reaction mixture was held at 100° C., 158 parts of diethanolamine and 43 parts of the above monoethanolamine adduct of N,N-dimethylaminopropyl-acrylamide were added thereto to carry out a reaction until increase of the viscosity stopped whereby a substrate resin (A-2) solution containing 80% of the resin solid matter was obtained.

The above substrate resin (A-2)(65 parts) and 46 parts of the later-described curing resin (B-3) were mixed with stirring, and under continued stirring, 1.49 parts of 88% formic acid was added and 298.5 parts of deionized water was gradually added thereto to obtain 400 parts of a 20% cationically electrodepositable paint.

Then, the procedure of preparation of the lead hydroxide suspension in Example 1 was repeated except that the ethylene glycol monobutyl ether was changed for propylene glycol monomethyl ether of the same amount with the former to obtain 17.93 parts of a lead hydroxide suspension. Thereafter, the successive procedures of Example 1 were repeated using 14.94 parts of the resulting suspension to obtain an emulsion. This emulsion was kept stable even when allowed to stand at 30° C. without any precipitate. This emulsion (100 parts) was mixed with 400 parts of the above emulsion prepared from the substrate resin (A-2) and the curing resin (B-3) to obtain an electrodepositable bath having a pH of 5.9 and an average particle size of the emulsion of 0.1 micron. When this bath was allowed to stand at 30° C. for 3 weeks, there arised no precipitate and the average particle size was 0.10 micron, and thus the bath was stable.

Curing resin (B-3)

A solution of 2.4 parts of azobisdimethylvaleronitrile in a mixture of 32.0 parts of METHB and 8.0 parts of hydroxyethyl acrylate was added dropwise over a period of 2 hours to 24 parts of butylcellosolve heated to 100° C. After aging for 1 hour, the mixture was heated to 125° C. and further aged for 1 hour to obtain 64.8 parts of a solution of curing resin (B-3) of an epoxy equivalent of 245 containing 60% of solid matter.

EXAMPLE 4

Methyl ethyl ketoxime (174 parts) was added dropwise to 222 parts of isophorone diisocyanate at 50° C., and 3 hours thereafter the mixture was diluted with 264 parts of propylene glycol monomethyl ether to prepare block isocyanate containing 60% of solid matter. This block isocyanate is referred to as curing resin (C-1).

The substrate resin (A-2) of Example 3 (100 parts), 34 parts of the above curing resin (C 1) and 1.8 parts of formic acid were mixed, and the mixture was diluted with 364 parts of deionized water to prepare a 20% emulsion.

This emulsion (400 parts) was mixed with 100 parts of the emulsion of Example 3 containing lead hydroxide to prepare an electrodepositable bath having a pH of 6 and an emulsion average particle size of 0.15 micron.

COMPARATIVE EXAMPLE 1

An aqueous 20% lead acetate solution (14.65 parts) was added to 500 parts of the 20% cationically electrodepositable paint of Example 3 consisting of the substrate resin (A-2) and the curing resin (B-3) to obtain 414.65 parts of a 20% (as concentration of resin solid matter) emulsion. As is the case with Example 3, in the emulsion 2.1 parts of metal lead is compounded per 100 parts of the resin solid matter in the electrodepositable paint. This electrodepositable bath had a pH of 5.5 and an emulsion average particle size of 0.10 micron.

COMPARATIVE EXAMPLE 2

The substrate (A-2) of Example 3 (65 parts), 35 parts of the curing resin (B-3) and 5.2 parts of lead oleate were mixed, and 1.49 parts of 88% formic acid was added thereto with stirring. Deionized water (294 parts) was gradually added thereto with stirring to obtain an emulsion containing 20% of resin solid matter and 2.1 parts of metal lead per 100 parts of the resin. This electrodepositable bath had a pH of 5.7 and an emulsion average particle size of 0.23 micron.

COMPARATIVE EXAMPLE 3

Procedures of Example 1 were repeated except that 2.69 parts of lead hydroxide in Example 1 was changed for 3.26 parts of basic lead sulfate.

COMPARATIVE EXAMPLE 4

Procedures of Example 1 were repeated except that 2.69 parts of lead hydroxide in Example 1 was changed for 3.2 parts of lead phosphate.

COMPARATIVE EXAMPLE 5

Diethanolamine (210 parts) was reacted with 380 parts of bisphenol A diglycidyl ether having an epoxy equivalent of 190 in the presence of 512 parts of propylene glycol monomethyl ether at 60° C. for 4 hours. The reaction mixture was heated to 120° C., and 223 parts of lead oxide was added portionwise thereto to carry out reaction for 6 hours. Then 20 parts of acetic acid was added, and the mixture was diluted with 3955 parts of deionized water to give a water dispersion containing 3.9% of metal lead as 15% of chelate lead. This dispersion (51.3 parts) was mixed with 447 parts of the 20% cationically electrodepositable paint of Example 1 to obtain an electrodepositable bath of pH 6.8 wherein 2.1 parts of metal lead was compounded per 100 parts of resin solid matter in the electrodepositable paint.

EXAMPLE 5

The substrate resin (A-2) solution (84.2 parts) prepared in the same manner as in Example 3, 40.8 parts of the curing resin (B-1) solution prepared in the same manner as in Example 1 and 11 parts of an aqueous 10% formic acid solution were mixed, and under continued stirring 364 parts of deionized water was added thereto to obtain 500 parts of a cationically electrodepositable paint containing 20% solid matter.

Then, the above substrate resin (A-2) solution (14.7 parts) was mixed with 2.5 parts of an aqueous 10% formic acid solution, 25 parts of deionized water was added with stirring, 7.8 parts of lead maleate (first class grade chemical, produced by KANTO KAGAKU CO., LTD.) was compounded therein, and the mixture was mixed in a ball mill for 24 hours to obtain 50 parts of a lead maleate paste containing 8% of metal lead. This paste (50 parts), 500 parts of the above 20% cationically electrodepositable paint and 37.5 parts of deionized water were mixed to obtain a cationically electrodepositable bath having a pH of 5.4. The content of metal lead therein was about 3.6% based on the resin solid matter.

EXAMPLE 6

Deionized water (343 parts) was added together with 54 parts of the curing resin (B-2) solution prepared in the same manner as in Example 2 to 103 parts of a formic acid-neutralized product of the substrate resin (A-1) solution which was prepared in the same manner as in Example 1 and neutralized with formic acid to obtain a 20% cationically electrodepositable paint.

The paste of lead maleate (60 parts) in Example 5 and 40 parts of deionized water were mixed with 500 parts of the above electrodepositable paint to obtain a cationically electrodepositable bath of pH 5.4. The content of metal lead was 4.2% based on the resin solid matter.

EXAMPLE 7

Procedures of Example 5 were repeated except that 40.8 parts of the 80% curing resin (B-1) solution in Example 5 was changed for 54 parts of the 60% curing resin (B-3) solution of Example 3.

EXAMPLE 8

A substrate resin (A-2) solution (100 parts) prepared in the same manner as in Example 3, 34 parts of a curing resin (C-1) solution prepared in the same manner as in Example 4 and 1.8 parts of formic acid were mixed, and then diluted with 364 parts of deionized water to prepare a 20% emulsion.

This emulsion (400 parts), 71 parts of the paste of Example 5 and 124 parts of deionized water were mixed to obtain a cationically electrodepositable bath of pH 6.1. The content of metal lead therein was 5.8% based on the resin solid matter.

Performance Tests and Their Results

The cationically electrodepositable paints obtained in Examples 1 to 8 and Comparative examples 1 to 5 were applied by cationical electrodeposition onto a non-treated steel plate so that the amount of the cured paint films became 20 microliters, and baked at 150° C. for 30 minutes to give cured paint films, respectively.

Performances of the above paints and cured paint films were investigated by the following methods.

(1) Paint Film-Destroying Voltage

The cationically electrodepositable paints were electrodeposited onto zinc phosphate-treated plates at 30° C. respectively, and voltage (V) at which painting became impossible by destruction of the paint films was designated as paint film-destroying voltage (V).

(2) Curability of the Paint Film

The above cured paint films (i.e., cured at the temperature indicated in the following table for 30 minutes) were immersed in a mixed solvent of acetone and methanol (1/1 by weight ratio) at 60° C. for 5 hours. The value obtained by dividing the weight of the films decreased by the immersion by the weight of the films before the immersion and then multiplying the resulting value by 100 was designated as gel percentage. Evaluation was made by the following criteria: ◯ gel percentage of 95% or more, Δ gel percentage of 90 to less than 95%, X gel percentage less than 90%.

(3) Smoothness

Evaluated by visual observation according to the following criteria:
◯ Good
X Smoothness of the paint film is spoiled by "wrinkle-like small unevenness", etc.

(4) Impact Resistance (the Du Pont System)

The coated test plates were stored for 24 hours in an air-conditioned room wherein the temperature was adjusted to 20°±1° C. and the humidity was adjusted to 75±2%. Then, on a Du Pont impact tester a cradle and an impact center of the prescribed sizes were mounted, and the resulting test plates were inserted between them with the coated surface facing upward, respectively. Next, a regular weight was made to fall on the impact center from the prescribed height, and breaking and exfoliation of each film by the impact were observed. Evaluation was made by the following criteria:
◯ not observed, Δ observed in a small extent, X observed in a striking extent

(5) Salt Spray Resistance

The coated plates were tested according to JIS Z 2371 for 500 hours. When the swell of the paint films within 2.0 mm on one side of the width of the creek from the cut (linear incisure) portion of the paint films was 8F or less (ASTM), the test plates were respectively evaluated as those standby the test, respectively.
◯ standed the test, X failed to stand the test

Results

The results are indicated together in the following table.

TABLE

| | EXAMPLE | | | | | | | |
|---|---|---|---|---|---|---|---|---|
| | 1 | 2 | 3 | 4 | 5 | 6 | 7 | 8 |
| Composition | | | | | | | | |
| Substrate resin | (A-1) | (A-1) | (A-2) | (A-2) | (A-2) | (A-1) | (A-2) | (A-2) |
| Curing resin | (B-1) | (B-2) | (B-3) | (C-1) | (B-1) | (B-2) | (B-3) | (C-1) |
| Lead compound | Lead hydroxide | Lead hydroxide | Lead hydroxide | Lead hydroxide | Lead maleate | Lead maleate | Lead maleate | Lead maleate |
| Result of performance tests | | | | | | | | |
| Paint | | | | | | | | |
| Paint film destroying | 400 | 400 | 400 | 400 | 350 | 350 | 350 | 350 |

TABLE-continued

| | | | | | | | | |
|---|---|---|---|---|---|---|---|---|
| voltage (V) | | | | | | | | |
| Cured paint film (150° C.) | | | | | | | | |
| Curability of the paint film | ○ | ○ | ○ | ○ | ○ | ○ | ○ | ○ |
| Smoothness | ○ | ○ | ○ | ○ | ○ | ○ | ○ | ○ |
| Impact resistance | ○ | ○ | ○ | ○ | ○ | ○ | ○ | ○ |
| Salt spray resistance | ○ | ○ | ○ | ○ | ○ | ○ | ○ | ○ |

| | | COMPARATIVE EXAMPLE | | | | |
|---|---|---|---|---|---|---|
| | | 1 | 2 | 3 | 4 | 5 |
| Composition | | | | | | |
| Substrate resin | | (A-2) | (A-2) | (A-2) | (A-2) | (A-2) |
| Curing resin | | (B-3) | (B-3) | (B-3) | (B-3) | (C-1) |
| Lead Compound | | Lead acetate | lead oleate | Basic lead sulfate | Lead phosphate | Chelated lead |
| Result of performance tests | | | | | | |
| Paint | | | | | | |
| Paint film destroying voltage (V) | | 200 | 300 | 350 | 350 | 200 |
| Cured paint film (150° C.) | | | | | | |
| Curability of the paint film | | Δ | Δ | × | × | Δ |
| Smoothness | | × | ○ | ○ | ○ | Δ |
| Impact resistance | | Δ | Δ | × | × | Δ |
| Salt spray resistance | | × | × | × | × | × |

We claim:

1. An article coated with a cationically electrodepositable paint composition comprising
   (A) a resin having hydroxyl groups and cationic groups,
   (B) an epoxy resin having at least 2 epoxy groups on average per molecule, each of which is directly bound to an alicyclic ring and/or a bridged alicyclic ring, and
   (C) lead hydroxide and/or lead maleate as curing catalyst(s).

2. The article of claim 1, wherein the composition contains lead hydroxide and/or lead maleate in total amount of 0.05 to 15% by weight based on the solid resin in terms of metal lead.

3. The article of claim 1, wherein the composition contains lead hydroxide and/or lead maleate in total amount of 0.5 to 10% by weight based on the solid resin in terms of metal lead.

4. The article of claim 1, wherein said resin (A) is a reaction product obtained by reacting a polyepoxide compound obtained from a polyphenol compound and epichlorohydrin with a cationizing agent.

5. The article of claim 1, wherein said resin (A) has a hydroxyl group equivalent within the range of 100 to 1,000.

6. The article of claim 1, wherein said resin (A) has an amine value within the range of 3 to 200 calculated as KOH (mg/g solids).

7. The article of claim 1, wherein said epoxy resin (B) has at least 3 epoxy function groups on average per molecule.

8. The article of claim 1, wherein said epoxy functional group of said epoxy resin (B) has a structure represented by either of the following general formulae (I) to (IV).

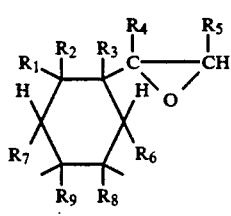
(I)

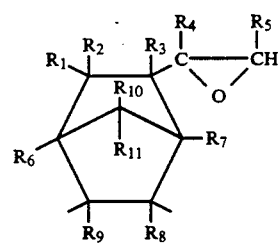
(II)

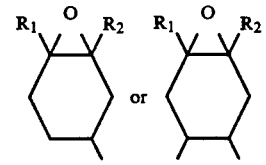
(III)

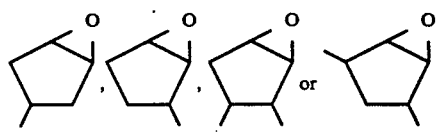
(IV)

wherein
$R_1$, $R_2$, $R_3$, $R_5$, $R_6$, $R_7$, $R_{10}$ and $R_{11}$ represent H, $CH_3$ or $C_2H_5$, respectively, while $R_4$, $R_8$ and $R_9$ represent H or $CH_3$, respectively.

9. The article of claim 1, wherein said epoxy resin (B) is a polymer having a recurring unit of the formula

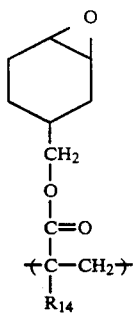
(VIII)
wherein $R_{14}$ is a hydrogen atom or methyl group.
10. The article of claim 1, wherein said epoxy resin (B) is an epoxy resin containing 2 to 30 recurring units of the formula
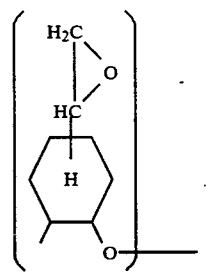
(VII)
* * * * *